F. KOTRABA.
NUT LOCK.
APPLICATION FILED AUG. 21, 1913.

1,150,770. Patented Aug. 17, 1915.

Witnesses

Inventor
Frank Kotraba
By Richard Beaver
his Attorney

UNITED STATES PATENT OFFICE.

FRANK KOTRABA, OF WESTCHESTER, NEW YORK.

NUT-LOCK.

1,150,770.  Specification of Letters Patent.  Patented Aug. 17, 1915.

Application filed August 21, 1913. Serial No. 785,932.

*To all whom it may concern:*

Be it known that I, FRANK KOTRABA, a subject of the Emperor of Austria-Hungary, residing at Westchester, in the county of Westchester and State of New York, have invented certain new and useful Improvements in Nut-Locks, of which the following is a specification.

My invention relates to nut locks.

One object of the invention is to provide a form of nut lock which is made separate from the nut, and capable of subsequent removal if desired.

Other objects of the invention are to provide a simple and highly efficient device of this kind and one which may be manufactured at low cost.

Specifically, the invention aims to provide an improved construction of nut lock, having a nut-embracing frame or body provided with one or more resilient lock arms engageable with the bolt secured in place by the nut.

With these and other objects in view, the invention has been embodied in preferable forms as illustrated in drawings accompanying this specification.

Figure 1:
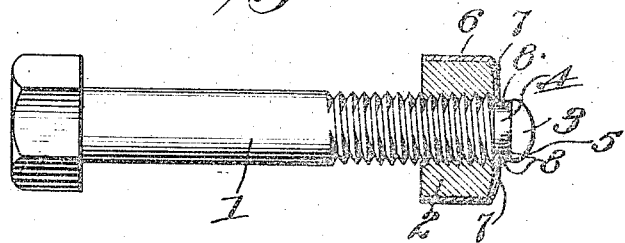
Figure 2:
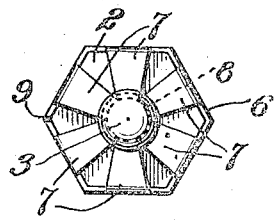
Figure 3:
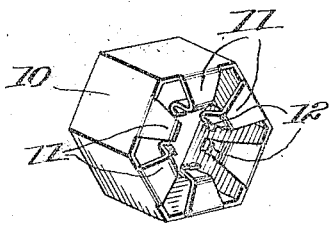

In said accompanying drawings: Figure 1 is a view showing a bolt and nut with my improvements applied thereto, the nut and nut lock being shown in section; Fig. 2 is an end view of the parts of Fig. 1; and, Fig. 3 is a perspective view of a modified form of the nut lock.

Referring to the drawings wherein like reference characters designate like or similar parts, and first to Figs. 1 and 2, a usual form of bolt 1 is shown having a screw-threaded shank upon which rides a usual nut 2. The bolt shank at the end over which the nut passes, is provided with a head 3 between which and the screw-threads of the shank is provided a groove or notch 4 extending circumferentially of the shank and defining a shoulder 5 at the junction of the head and shank at the groove. The nut lock is formed separate from the nut and bolt and consists of a hollow body 6 adapted to embrace or inclose the nut and being provided with one or more resilient lock arms 7, the lock arms being shown in Figs. 1 and 2 as extending substantially at right angles to the body and terminating in lugs 8 extending at right angles to the arms.

Although the nut body is shown as octagonal, I do not limit myself to this specific shape inasmuch as the shape of the body will be varied according to the shape of the nut in connection with which it is used.

In use, the nut 2 is first screwed onto the bolt to the proper extent and thereafter the nut lock is passed over the end of the bolt and over the nut, during which passage of the nut lock, the head 3 serves to spring the arms 7 and lugs 8 thereon outwardly and away from the bolt shank so that when the lugs 8 have passed beyond the head, the spring action of the arms 7 urges the lugs 8 into the groove 4, as best seen in Fig. 1. When the lugs 8 have thus sprung into the groove 4, should the nut loosen, it could not ride off of the bolt inasmuch as it would abut against the arms 7 and force the ends of the lugs 8 into tight engagement with the shoulder 5.

The nut lock may be manufactured or made in various ways and from any suitable material but is preferably stamped from resilient sheet metal or of a metal which will permit tempering of arms such as 7 so as to be resilient. As one way of making the nut lock, the same has been stamped into a blank from resilient sheet metal and then bent into proper form and the edges of the blank joined together as by soldering at 9.

In Fig. 3, a modified construction of the nut lock is shown. In this figure, the body is designated 10 and the resilient lock arms are designated 11. These lock arms are here shown as cambered so as to increase their tension or spring action. Arms 11 terminate in lugs 12 which extend in a direction parallel with the wall of the body 10 and which are adapted to engage at a groove of a bolt such as 4 of Fig. 1.

As merely the preferred embodiment of the invention has been illustrated herein and changes within the spirit and scope of the invention may suggest themselves, such changes are reserved, provided they fall within the spirit and scope of the appended claims.

Having thus described my said invention, what I claim as new and desire to secure by Letters Patent is:—

1. A nut lock in combination with a bolt having a threaded portion and a rounded end, said bolt being provided with an annular groove forming a neck between the threaded portion of the bolt and the rounded end whereby the rounded end will form a spreading head, a nut threaded upon said bolt, and a locking element mounted upon said nut and including resilient arms having their free end portions bent to form lugs engaging said neck between said head and the threaded portion of said bolt, said head engaging said lugs to spread said arms when placing said locking element upon said nut.

2. In a nut lock a locking element comprising a collar, and resilient arms extending from the outer edge of said collar toward the center thereof and having their inner end portions bent inwardly toward the inner end of said collar and then outwardly whereby said nut lock may be used in connection with bolts of varying diameters.

In testimony whereof I affix my signature in presence of two witnesses.

FRANK KOTRABA.

Witnesses:
　WALTER J. MAY,
　FERD. GRAMCKO.